United States Patent [19]

Yukawa

[11] Patent Number: 4,949,364
[45] Date of Patent: Aug. 14, 1990

[54] COUNT ERROR DETECTING DEVICE FOR COUNT TYPE MEASURING INSTRUMENTS

[75] Inventor: Hiroshi Yukawa, Hachiouji, Japan

[73] Assignee: Olympus Optical Co., Ltd., Tokyo, Japan

[21] Appl. No.: 255,377

[22] Filed: Oct. 11, 1988

[30] Foreign Application Priority Data

Oct. 12, 1987 [JP] Japan .................. 62-256516

[51] Int. Cl.$^5$ .................. G01R 23/02; H03K 21/40
[52] U.S. Cl. .................. 377/28; 328/149;
340/653; 324/787; 307/360; 307/512
[58] Field of Search .............. 307/350, 355, 360, 512;
328/138, 146, 147, 149; 324/787; 377/28;
340/653

[56] References Cited

U.S. PATENT DOCUMENTS 4,031,464  6/1977  Norberg .................. 307/360
4,529,892  7/1988  Reilly et al. .................. 307/360
4,574,206  3/1986  Todokoro et al. .................. 307/360

Primary Examiner—John S. Heyman
Attorney, Agent, or Firm—Cushman, Darby & Cushman

[57] ABSTRACT

A count error detecting device for count type measuring instruments is provided with a phase-shift circuit producing two N phase interpolation signals shifted in phase by 45° from two signals in phase by 90° each other; a plurality of comparators converting the two N phase interpolation signals into pulse signals; a pair of coincidence circuits connected to the comparators; a pulse discriminator circuit connected to the coincidence circuits; a counter circuit connected to the pulse discriminator circuit; and a flip-flop connected to one of the coincidence circuits and the pulse discriminator circuit. Thus, a circuit configuration of the device is facilitated, the ability of a detector can be fully displayed, and measurement efficiency can be widely improved. A conventional count error detecting circuit may be connected to the count error detecting device as an alarm circuit.

4 Claims, 3 Drawing Sheets

COUNT ERROR DETECTING DEVICE FOR COUNT TYPE MEASURING INSTRUMENTS

BACKGROUND OF THE INVENTION a. Field of the invention:

The present invention relates to a count error detecting device for count type measuring instruments with optical scales used in microscopes for measurement.

b. Description of the prior art:

A conventional circuit for count type measuring instruments with optical scales has comprised, as shown in, for example, FIG. 1, input terminals a and b for two signals A and B (FIG. 2) having a phase difference of 90° each other to detect the directivity of measurement and perform interpolation which are derived from a detector D; a phase-shift circuit 1 composed of an inverting amplifier AMP inverting the signal A and voltage dividers $R_1$, $R_2$ and $R_3$, $R_4$ producing signals A+45° and B+45° which travel in phase by 45° as compared with the signals A and B; comparators $COMP_1$, $COMP_2$, $COMP_3$, $COMP_4$ each of which is composed of a Schmitt circuit outputting a signal with constant amplitude when an input voltage is more than a preset value and which convert the signals A, A+45°, B, B+45° into pulse signals A', A'+45°, B', B'+45°, respectively (FIG. 3); a coincidence circuit (exclusive OR circuit) $EOR_1$ in which, when the signals A' and B' have different levels from each other, its output turns to a high (H) level and, when both the signals bear the "H" level or a low (L) level, the output turns to the "L" level; a coincidence circuit (exclusive OR circuit) $EOR_2$ in which, when the signals A'+45° and B'+45° have different levels from each other, the output turns to the "H" level and, when both the signals bear the "H" level or the "L" level, the output turns to the "L" level; a pulse discriminator circuit 2 discriminating the directivity of measurement in comparison between the output signals (having a frequency twice that of the input signal each) of the coincidence circuits $EOR_1$, $EOR_2$ and supplying output signals corresponding to the discriminated result; and a counter circuit 3 counting up or counting down the number of output signals of the pulse discriminator 2. This circuit configuration is such that eight pulses (360°÷90°×2=8) are to be counted with respect to each graduation of a scale not shown and thereby, for instance, if the scale is graduated each 4 μm, measurement can be made with a unit of 0.5 μm.

Also, the use of such a count type measuring instrument will cause defects that, as an example, when a stage on which an object to be measured is placed is moved at a high speed, a measurement frequency becomes extremely high, thus being in excess of followable frequencies of the detector or the subsequent circuits (namely, the pulse discriminator circuit 2 and the counter circuit 3), with the result that measurement errors are produced. The conventional circuit for count type measuring instruments has therefore added a count error detecting circuit, as depicted in FIGS. 1 and 4, comprising a leading edge detector circuit 4 detecting a leading edge of the output signal A' of the comparator $COMP_1$ to output a signal α; an integrator circuit 5 initiating integration when the signal α is inputted to output a signal β; a comparator $COMP_5$ composed of the Schmitt circuit and outputting a signal γ when the signal β is inputted; and a one-shot timer circuit 6 configured to be actuated at a trailing edge of the signal γ and to be reset at the leading edge and outputting an error signal θ when a preset time in seconds goes on without the timer reset after the timer actuation, and outputting an error signal through the utilization of pulse behaviors that, when a measurement frequency becomes higher than a preset value, the signal β trails before its leading edge passes over the output level of the comparator.

However, a factor determining a detection speed limitation of the count type measuring instruments is largely composed of a followable frequency limitation of the detector and the error detecting circuit is adapted to previously detect the limitation. Specifically, although each amplitude of the two phase signals A, B issued from the detector D is reduced when the measurement frequency increases (FIG. 3), it must be detected as an error before being lower than the detection levels of the comparators $COMP_1$, ..., $COMP_4$. It is therefore necessary to raise the detection level of the comparator $COMP_5$ to ensure a sufficient margin, so that the ability of the detector cannot sufficiently be displayed and generally measurement efficiency is decreased. In addition, since the followable frequency limitation of the detector depends on a coupling capacity thereof, which shows a wide variation, and also on an ambient temperature, its follows that a necessary margin is further increased and the measurement efficiency is more decreased.

SUMMARY OF THE INVENTION

An object of the present inveniton is to provide a count error detecting device for count type measuring instruments in which the ability of the detector can sufficiently be displayed and general measurement efficiency can widely be improved.

Another object of the present invention is to provide a count error detecting device for count type measuring instruments in which its circuit configuration is extremely simple.

In a count type measuring instrument in which two N phase interpolation signals are produced from two phase signals shifted in phase by 90° each other which are derived from the detector and in which count is made on the basis of the two phase signals and the two N phase interpolation signals, the count error detecting device for count type measuring instruments according to the present invention is constructed to generate an error signal when each amplitude of the two N phase interpolation signals is less than a preset value. Thus, since each amplitude of the two N phase interpolation signals is $1/\sqrt{2}$ times that of the two phase signals and the two N phase interpolation signals exhibit first the amplitude smaller than the preset value any time, a margin can be maintained at a minimum, that is, the preset value can be set to the lowest limit.

According to a preferred formation of the present invention, when the amplitude of a signal, of the two N phase interpolation signals, shifted in phase by 45° or by approximately 45° as compared with either of the two phase signals becomes less than the preset value, the count error detecting device is such as to generate an error signal.

According to another preferred formation of the present invention, the count error detecting device is further provided with an alarm circuit generating an alarm signal when each cycle of the two phase signals is smaller than the preset value.

These and other objects as well as the features and the advantages of the present invention will become apparent from the following detailed description when taken in conjunction with the accompanying drawings.

Description of the Preferred Embodiment

Figure 1:
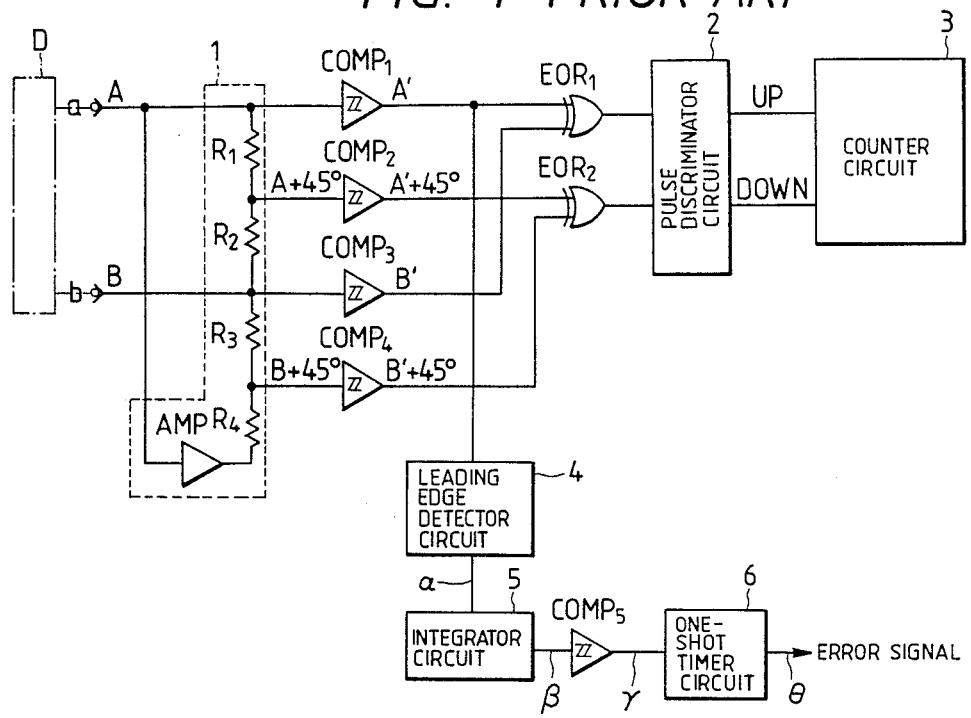
FIG. 1 is a circuit diagram of a conventional count type measuring instrument.
Figure 2:
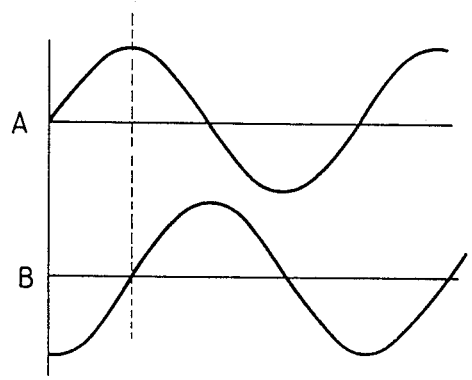
FIG. 2 is a view showing an example of two phase signals.
Figure 3:
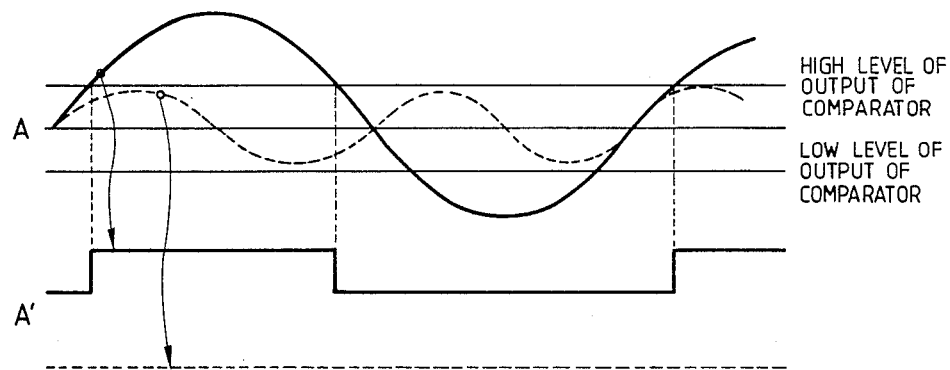
FIG. 3 is a view showing a working principle of a comparator.
Figure 4:
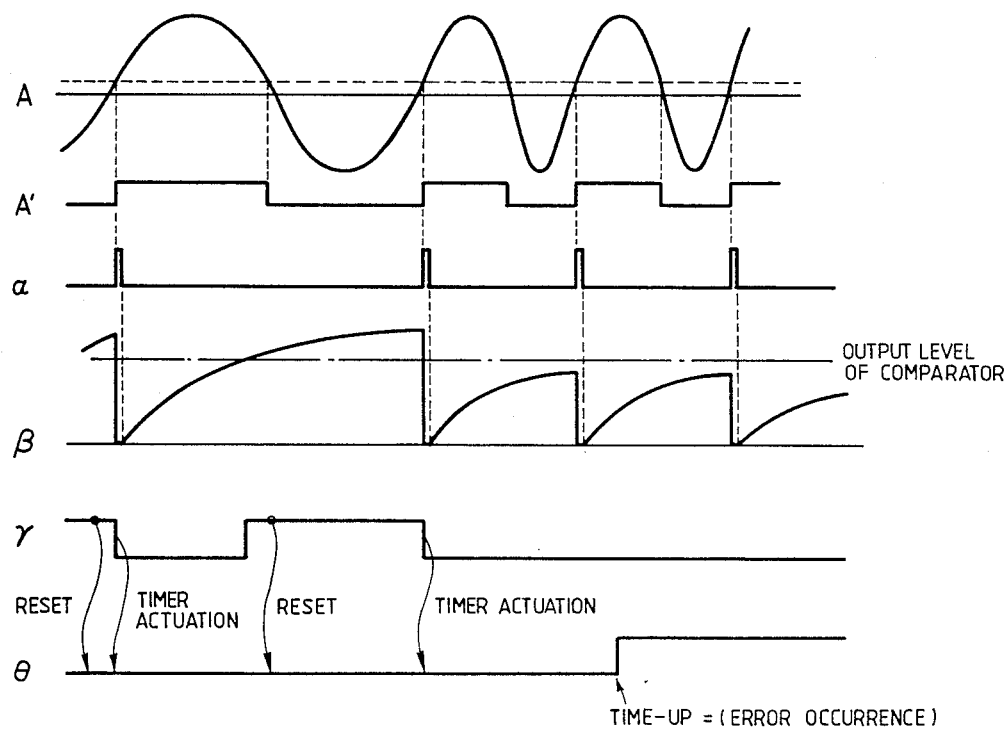
FIG. 4 is a flow chart showing a working principle of the conventional count type measuring instrument depicted in FIG. 1.

Based on an embodiment shown in the drawings, the present invention will be described in detail below, with like reference numerals and symbols used to designate the members employed in the embodiment.

Figure 5:
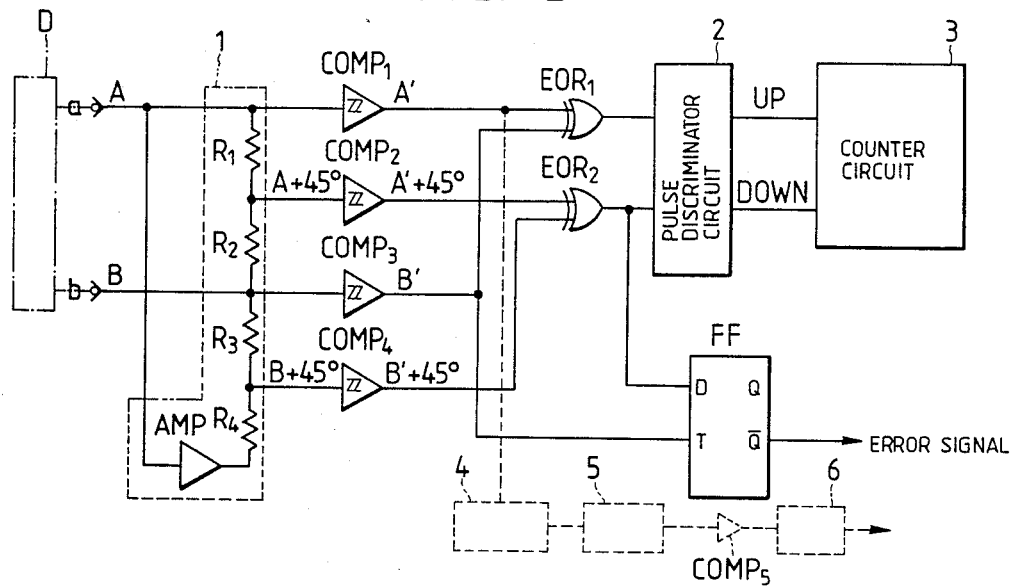
FIG. 5 is a circuit diagram of the count type measuring instrument including an embodiment of a count error detecting device according to the present invention.

In FIG. 5, reference symbol FF represents a flip-flop designed so that the output signal (A'+45°)+(B'+45°) (exclusive OR signal) of the coincidence circuit EOR$_2$ is inputted to a data input terminal D and the output signal B' of the comparator COMP$_3$ is inputted to a clock pulse input terminal T, which constitutes a count error detecting circuit.

Figure 6:
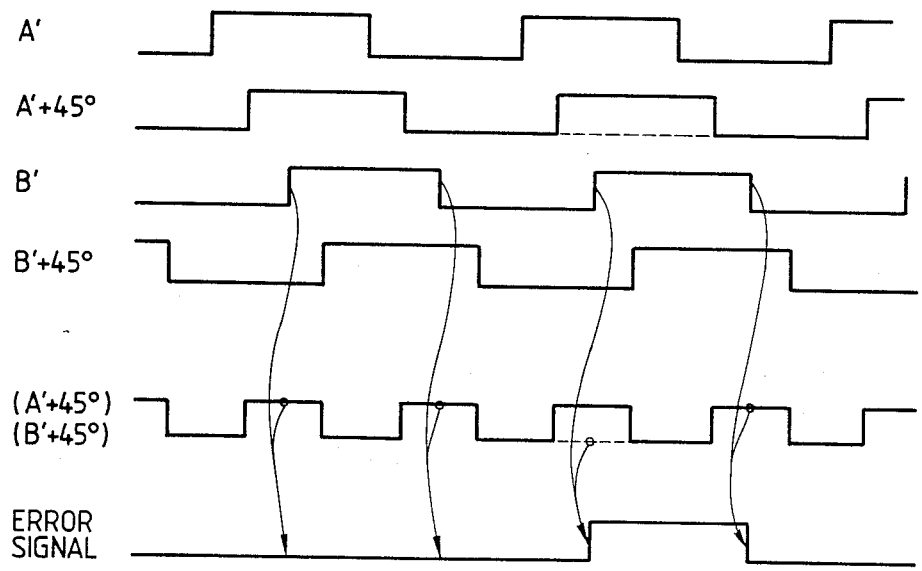
FIG. 6 is a time chart showing a working principle of the embodiment depicted in FIG. 5.

According to this embodiment, as shown in FIG. 6, where the amplitude of the interpolation signal A+45° exceeds the preset value, that is, the signal A'+45° keeps the "H" level, as indicated by a solid line of FIG. 6, at the leading edge or the trailing edge of the signal B' and the signal (A'+45°)+(B'+45°) keeps the "H" level, an output from an output terminal $\overline{Q}$ of the flip-flop FF turns to the "L" level. In contrast to this, where the amplitude of the interpolation signal A'+45° is smaller than the preset value, that is, the signal A'+45° turns to the "L" level as indicated by a dotted line and the signal (A'+45°)+(B'+45°) turns to the "L" level, the output of the output terminal $\overline{Q}$ of the flip-flop FF reaches the "H" level, which becomes an error signal. Here, each amplitude of two phase interpolation signals A+45°, B+45° is 1/$\sqrt{2}$ times that of the two phase signals A, B. Further, the detection levels (hysteresis widths) of the subsequent comparators COMP$_1$, ..., COMP$_4$ are defined by noise resistance. Therefore, since the two phase interpolation signals exhibit first the amplitude smaller than the preset value any time where the amplitude of the signal issued from the detector turns small, the margin can be maintained at a minimum, that is, the preset value can be set to the lowest limit. As a result, the ability of the detector can be sufficiently displayed and general measurement efficiency can be widely improved.

Although the embodiment shows an example that the two phase interpolation signals are produced, such a manner that interpolation signals exceeding the two phase interpolation signals in number, namely, the two N phase interpolation signals (where N is integer) are produced brings about also the same effect.

Also, the conventional count error detecting circuit already mentioned may be added to the embodiment of the present invention, as indicated by dotted lines in FIG. 5, so as to be used as an alarm circuit actuated prior to the count error detecting circuit of the present invention.

As described above, the count error detecting circuit for count type measuring instruments according to the present invention can sufficiently display the ability of the detector and can widely improve general measurement efficiency. Further, the count error detecting circuit of the present invention is constructed from only the flipflop and is extremely simple in circuit configuration.

What is claimed is:

1. A count error detecting device for count type measuring instruments, comprising:
    phase-shift means for producing two N phase interpolation signals from two first signals shifted in phase by 90° with respect to each other and outputted from a detector;
    means for generating a signal representing an Exclusive-Or function of said two interpolation signals;
    count means for making count on the basis of said two first signals and said two N phase interpolation signals; and
    error signal generating means for generating an error signal on the basis of said Exclusive-Or signal and one of said two first signals.

2. A count error detecting device according to claim 1, wherein said error signal generating means is a flip-flop.

3. A count error detecting device according to claim 1, wherein:
    each said two N phase interpolation signals being substantially shifted in phase by 45° with respect to a corresponding one of said two first signals;
    when the amplitude of either one of said two N phase interpolation signals becomes smaller than a preset value, said error signal generating means generates the error signal.

4. A count error detecting device according to claim 1, further comprising:
    alarm means for generating an alarm signal when each cycle of said two first signals becomes smaller than a preset value.

* * * * *